July 24, 1962 D. H. YOUNG 3,045,691
AIRCRAFT BREATHING SYSTEMS
Filed Feb. 15, 1960 4 Sheets-Sheet 1

INVENTOR
DAVID H. YOUNG
BY
Wenderoth, Lind & Ponack
ATTORNEYS

INVENTOR
DAVID H. YOUNG

July 24, 1962 D. H. YOUNG 3,045,691
AIRCRAFT BREATHING SYSTEMS
Filed Feb. 15, 1960 4 Sheets-Sheet 4

INVENTOR
DAVID H. YOUNG

BY
Wenderoth, Lind & Ponack
ATTORNEYS 3,045,691
AIRCRAFT BREATHING SYSTEMS
David Herbert Young, Eastcote, England, assignor to The Walter Kidde Company Limited, Greenford, England, a company of Great Britain
Filed Feb. 15, 1960, Ser. No. 8,705
Claims priority, application Great Britain Feb. 18, 1959
1 Claim. (Cl. 137—81)

The present invention relates to a reducing valve system for regulating the pressure of gas flowing in a conduit, in which means are provided for rapidly changing over the regulated pressure from one value to another value, which may differ by a large amount from the first value. A particular application of the present invention is to oxygen breathing systems for use in aircraft.

There is already described in U.S.A. patent application Serial No. 769,784 an oxygen breathing system for installation in the passenger cabin of a pressurised aircraft which is adapted to supply oxygen to breathing masks for use by the passengers alternatively at a lower pressure for therapeutic purposes in normal aircraft operation and at a higher pressure in the event that the cabin pressure of the aircraft falls below a predetermined minimum.

In both cases the oxygen is supplied to the individual masks used by the passengers through an oxygen main conduit in the cabin. For therapeutic supply the hose of a breathing mask is attached to an appropriate outlet provided in the main conduit near the seat of the passenger requiring therapeutic oxygen supply. In the event of cabin decompression oxygen at the higher pressure is automatically admitted to the main in response to a barometric device, which acts when the cabin atmosphere reaches a predetermined minimum pressure, and this triggers the release of breathing masks from lockers over all the passenger seat positions.

The existing system requires separate reducing valves for the high and low supply pressures and other separate controls.

It is an object of the present invention to provide a gas pressure regulating system by which gas may be fed through a single connection from a gas storage (which may be, for example, high pressure oxygen storage cylinders, operating, for example, at 1800 p.s.i. or an oxygen converter delivering oxygen at, for example 150 p.s.i.) into a conduit in which its pressure is controlled at one of alternative values.

According to the present invention a gas pressure regulating valve comprises a body having therein a pair of spaced pressure sensitive members of different effective surface area and affixed to a common member for moving a valve member in relation to a seating to control gas pressure, both said pressure sensitive members being acted on by a common spring the space between the two pressure sensitive members being enclosed so that the gas pressure between the pressure sensitive members can be varied to regulate the value of the outlet pressure. Preferably the space may be alternatively vented to atmosphere or connected to the outlet of the regulator valve so as to balance the pressures on the opposite pair of one of the pressure sensitive members.

The term "pressure sensitive member" is used herein broadly to describe any separator member which will move in response to differential gas pressure. Thus, it may be applied equally to a conventional diaphragm and to a sliding piston. The pressure sensitive members are most conveniently in the form of diaphragms.

In an aircraft oxygen breathing system of the type referred to above the regulating valve is ordinarily set to regulate the outlet pressure to the lower therapeutic supply pressure and for this purpose the valve member is controlled by the gas pressure on the larger diahragm and the smaller diaphragm is rendered inoperative.

The connection of the diaphragm interspace with the valve outlet substantially equalises the pressure on the two faces of the inner diaphragm and thus renders it ineffective, whilst the venting of the interspace equalizes pressures on the outer diaphragm and similarly renders it ineffective.

For an oxygen breathing system of the type referred to, it is desirable that the outlet pressure should be raised to the higher regulated value immediately emergency conditions arise. A master control valve is therefore provided which automatically effects a change in the pressure in the interspace between the diaphragms when the cabin pressure drops to a predetermined figure, for example, to a cabin pressure corresponding to an altitude of 14,000 ft., so as to bring the smaller of the diahragms of the regulating valve into operation to regulate the outlet pressure to the higher pressure required in the event of emergency. Where the inner diaphragm is the smaller diaphragm this may be effected by venting the interspace to atmosphere by switching of the master control valve, whereas in therapeutic operation the interspace is maintained at the regulated gas outlet pressure.

The master control valve is preferably a simple slide selector valve in which the position of the slide is controlled by sealed metal bellows, so as to respond to changes in the pressure of the ambient atmosphere.

The invention is hereinafter further described with reference to the accompanying drawings wherein.

Figure 1:
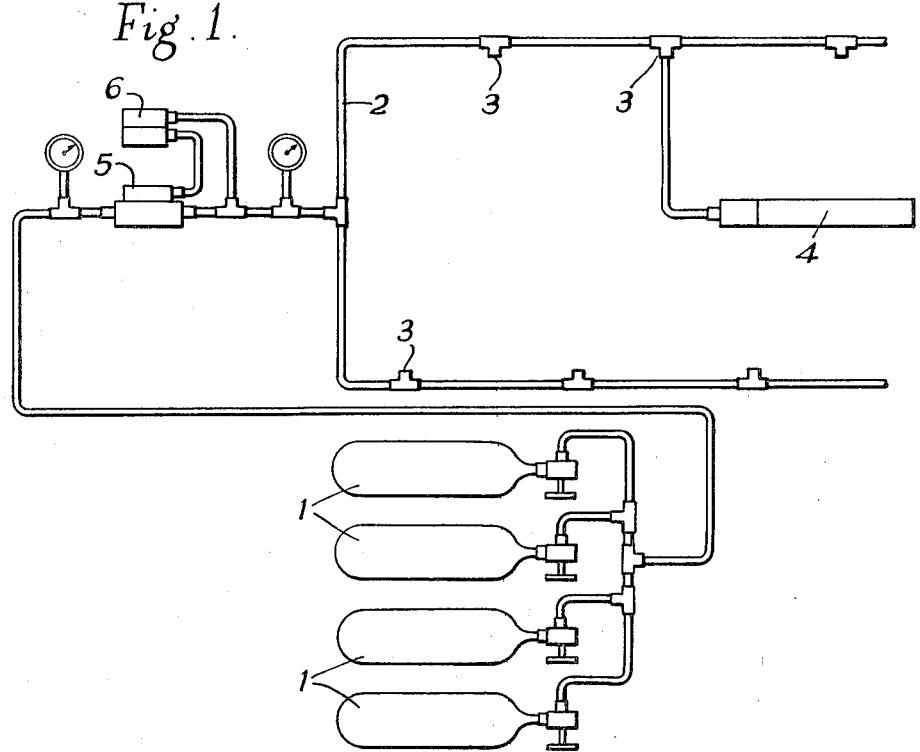
FIGURE 1 is a diagram of an oxygen breathing system.

The system shown in FIGURE 1 is designed to feed oxygen from storage cylinders 1 to an oxygen supply main 2 in an aircraft cabin. The main 2 is provided with a number of outlet connectors 3, into some of which individual breathing masks can be plugged for therapeutic purposes, and into others of which emergency mask stowage units 4 are permanently plugged.

The oxygen supply fed into the main 2 can be regulated to two different pressures by the double regulator valve 5 under the control of the master control valve 6.

Figure 2:
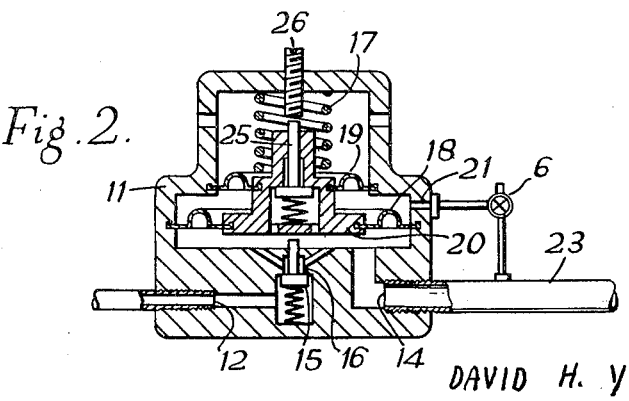
FIGURE 2 is a section of a double pressure regulating valve.

The construction of the double regulator valve 5 is shown in FIGURE 2, from which it will be seen that it comprises a body 11, having a high pressure inlet 12 and an outlet 14. The outlet pressure is determined in the usual way by the effective aperture between a valve member 15 and its seating 16. The valve member is forced away from its seating by a main diaphragm spring 17 which is counteracted by the outlet gas pressure acting on a diaphragm. In the present construction an inner large diaphragm 18 and an outer small diaphragm 19 are both connected to a central bush 20, on which the spring 17 bears.

The body 11 is provided with a vent outlet 21 between the diaphragms 18 and 19 and this is connected to a master control valve 6, by means of which the space between the diaphragms can be alternatively adjusted to atmospheric pressure by venting to atmosphere or be brought to outlet pressure by connection to the outlet pipe 23.

When the outlet pressure is to be controlled to a lower pressure, the space between the diaphragms 18 and 19 is vented to atmosphere so that the diaphragm spring is counteracted by the force produced by the pressure of gas on the larger diaphragm 18.

When gas at the higher pressure is to be fed to the main 2 the larger diaphragm 18 is rendered ineffective by equalising the pressure on its opposite sides and then the spring 17 is counteracted only by the pressure of gas acting on the smaller diaphragm 19.

The double pressure regulator 5 is provided with a spring-loaded relief valve member 25 mounted in the bush 20 and adapted to be unseated by contact with a stop pin 26 in the body 11. This relief valve protects the diaphragms 18 and 19 from being ruptured.

The master control valve 6 is barometrically responsive to switch the regulator valve to the higher pressure condition when the cabin atmosphere reaches a predetermined minimum to ensure that oxygen is fed to the main 2 at the higher pressure required under emergency conditions.

The master control valve comprises a body 31 having an inlet 32 for connection to the space between the diaphragms 18 and 19, an outlet 33 vented to atmosphere and an outlet 34 for connection with the outlet pipe 23.

The inlet 32 is alternatively connected to one of the two outlets, depending on the position of a slide 35, which is free to slide in a guide 36, which is sealed in the bore of the body 31 by O-rings 37 and is provided with apertures in register with the inlet 32 and outlets 33 and 34.

Figure 3:
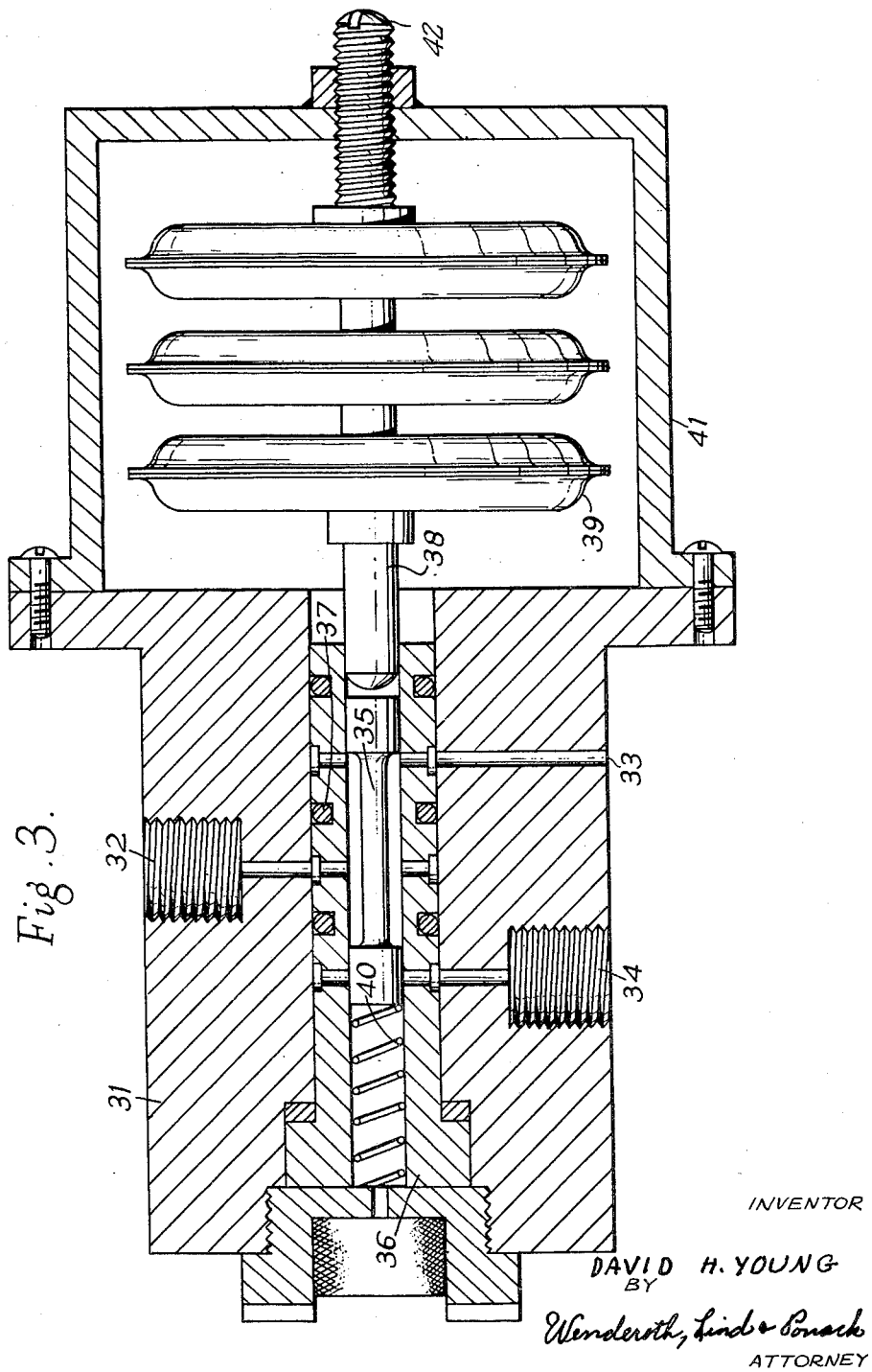
FIGURE 3 is a section of a master control valve.

The slide 35 is moved lengthwise in its guide 36 in one direction by a push rod 38 moved by a sealed metal bellows 39 and in the other direction by a return spring 40. It will be appreciated that the push rod 38 and bellows 39 can be set by means of an adjusting screw 42 so as to move the slide 35 to the left in FIGURE 3 when the ambient atmospheric pressure acting on the bellows 39 falls below a predetermined pressure. This movement of the slide 35 automatically connects the diaphragm interspace to the outlet pipe 23 and automatically raises the outlet pressure to the higher pressure required in the main 2 under emergency conditions.

The bellows 39 is enclosed by a case 41, the interior of which is vented to atmosphere.

Figure 4:
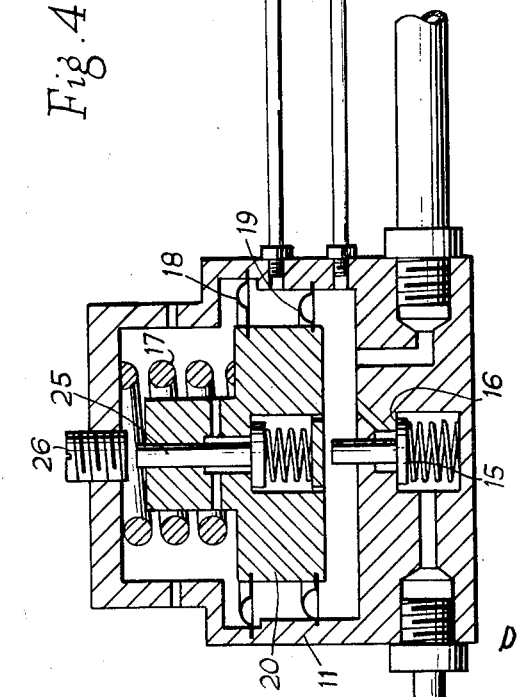
FIGURE 4 shows a modified form of pressure regulating valve connected with a simple master control valve.

In the construction of pressure regulating valve shown in FIGURE 4 the position of the large and small diameters 18 and 19 is reversed, but in all other essential respects the construction of the regulating valve is the same as that shown in FIGURE 2. The effect of this change is that the valve will regulate the output pressure to the lower pressure when the space between the two diaphragms is at outlet pressure.

The regulating valve is controlled by a master valve 56, which comprises a sealed metal bellows 57 acting on a snap disc 58, which in turn moves a spring-loaded valve shuttle 60 by means of a push rod 61 between the position shown in FIGURE 4, in which a passage is established between connections 62 and 63, so as to maintain the diaphragm interspace at outlet pressure, and a position in which the valve shuttle 60 seals off this connection and unseals a vent 64 to bring the interspace to atmospheric pressure and thus automatically raise the outlet pressure to higher pressure.

An over-riding manual control is provided for the same purpose in case of failure of the bellows 57. This control consists of a pivoted lever 65, adapted to bear on a shoulder 66 on the push rod 61 and acted on by a pull member 67, which may be moved between the alternative positions defined by the engagement of a spring-loaded ball 68 with notches 69.

Figure 5:
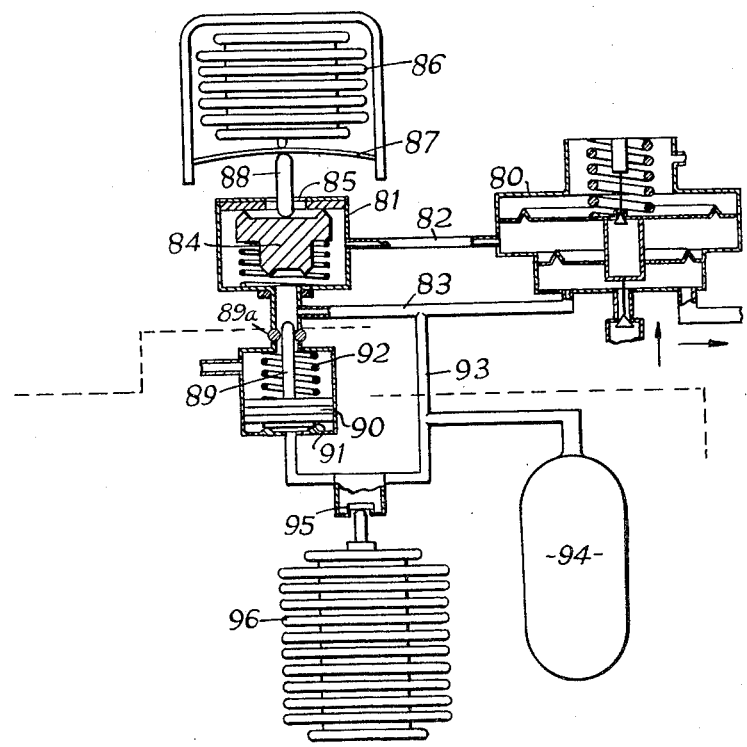
FIGURE 5 shows the modified form of pressure regulating valve connected with a master control valve and automatic reset mechanism.

The system shown in FIGURE 5 is arranged so that a double pressure regulator, shown diagrammatically, but identical in construction with that shown in FIGURE 4 is switched over to deliver higher pressure when the ambient atmospheric pressure falls to a predetermined pressure and is switched back to lower pressure after a predetermined interval, unless the ambient atmospheric pressure has in the interval decreased below a somewhat lower minimum pressure.

In the apparatus the double pressure regulator 80 is provided with a master control valve 81, which in normal operating conditions affords a communication between a passage 82 and a passage 83 so as to maintain the interspace between the diaphragms at outlet pressure and thus makes the regulator valve 80 deliver gas at the lower pressure.

When the valve piston 84 is depressed it seals off the passage 83 and permits the diaphragm interspace of the regulator valve to vent to atmosphere through a vent 85. This movement of the valve piston 84 takes place at, for example, an apparent cabin altitude of 14,000 feet under the influence of a bellows capsule 86 acting on a snap disc or reed 87, which in turn actuates a push rod 88.

The valve piston 84 is returned to its normal position by means of a push rod 89 secured to a piston 90 and sliding in a sealing ring 89a. At the lower pressure of the system the piston 90 is held against a seat 91 by the pressure of a valve spring 92. When the gas pressure on the piston is at a predetermined pressure between the lower and higher pressures of the system, the piston 90 is unseated, so as to expose a much greater area and the piston moves rapidly to snap the master control valve over against the force produced by the bellows capsule 86.

The gas pressure on the piston 90 changes slowly in response to change of regulator outlet pressure, because an orifice 93 and a reservoir 94 are provided in the connection to the passage 83. After the delay required for the necessary build up of pressure, the master control valve 81 will be returned to its start position, unless there has been a further reduction of ambient atmospheric pressure to an apparent cabin altitude of, say, 16,000 feet, as there would have been in the event of rapid decompression of an aircraft cabin. In that case a valve 95 would have been opened by a bellows capsule 96 to vent the reservoir 94 to atmosphere. The piston 84 is then held in a position to vent the diaphragm interspace to atmosphere for as long as the valve 95 is held open.

I claim:

In an oxygen breathing system for aircraft, a gas pressure regulating system comprising, in combination, a gas pressure regulating valve comprising an enclosed body having gas inlet and gas outlet passages, a valve seating in said gas inlet passage, a valve member movable in relation to said valve seating, an inner diaphragm and an outer larger diaphragm secured in said body and extending transversely to the direction of movement of said valve, a common member to which the inner diaphragm and the outer larger diaphragm are secured in spaced relation and moving said valve member, said diaphragms being secured in spaced relation in said body, a compression coil spring axially located in said body acting on said common member in opposition to gas pressure on said diaphragms, the space between said diaphragms being enclosed and provided with an inlet, a master control valve having connections to the inlet to the space between the said diaphragms, to the outlet of said regulating valve and to atmosphere, said master control valve connecting said space to atmospheric pressure or to the regulating valve outlet pressure for controlling the outlet pressure from the regulating valve according to the setting of said master control valve, a barometric device connected to said master control valve to switch the master control valve to vent said space to atmosphere when the ambient atmospheric pressure is reduced to a predetermined minimum to increase the outlet pressure of the regulating valve when the ambient atmospheric pressure falls below a predetermined minimum, pressure-operated resetting means connected to the master control valve, a time delay means through which said resetting means is connected to the regulating valve outlet, said resetting means resetting the master control valve to bring the space between the diaphragms to outlet pressure, against the force of said barometric device when subjected to a predetermined gas pressure in excess of the lower regulated outlet pressure of the regulating valve, a vent valve in the connection to the resetting means, and a second barometric device controlling said vent valve to open said vent valve at a lower ambient atmosphere pressure than that at which the first barometric device operates the master control valve.

References Cited in the file of this patent

UNITED STATES PATENTS

| | | |
|---|---|---|
| 905,188 | Hulse | Dec. 1, 1908 |
| 2,089,144 | Work | Aug. 3, 1937 |
| 2,739,611 | Cornelius | Mar. 27, 1956 |
| 2,919,711 | Lord | Jan. 5, 1960 |

FOREIGN PATENTS

| | | |
|---|---|---|
| 510,403 | Great Britain | Aug. 1, 1939 |